W. M. McCOMB.
PROCESS OF CONVERTING LIQUID HYDROCARBONS.
APPLICATION FILED OCT. 15, 1918.
1,337,144.
Patented Apr. 13, 1920.
2 SHEETS—SHEET 1.
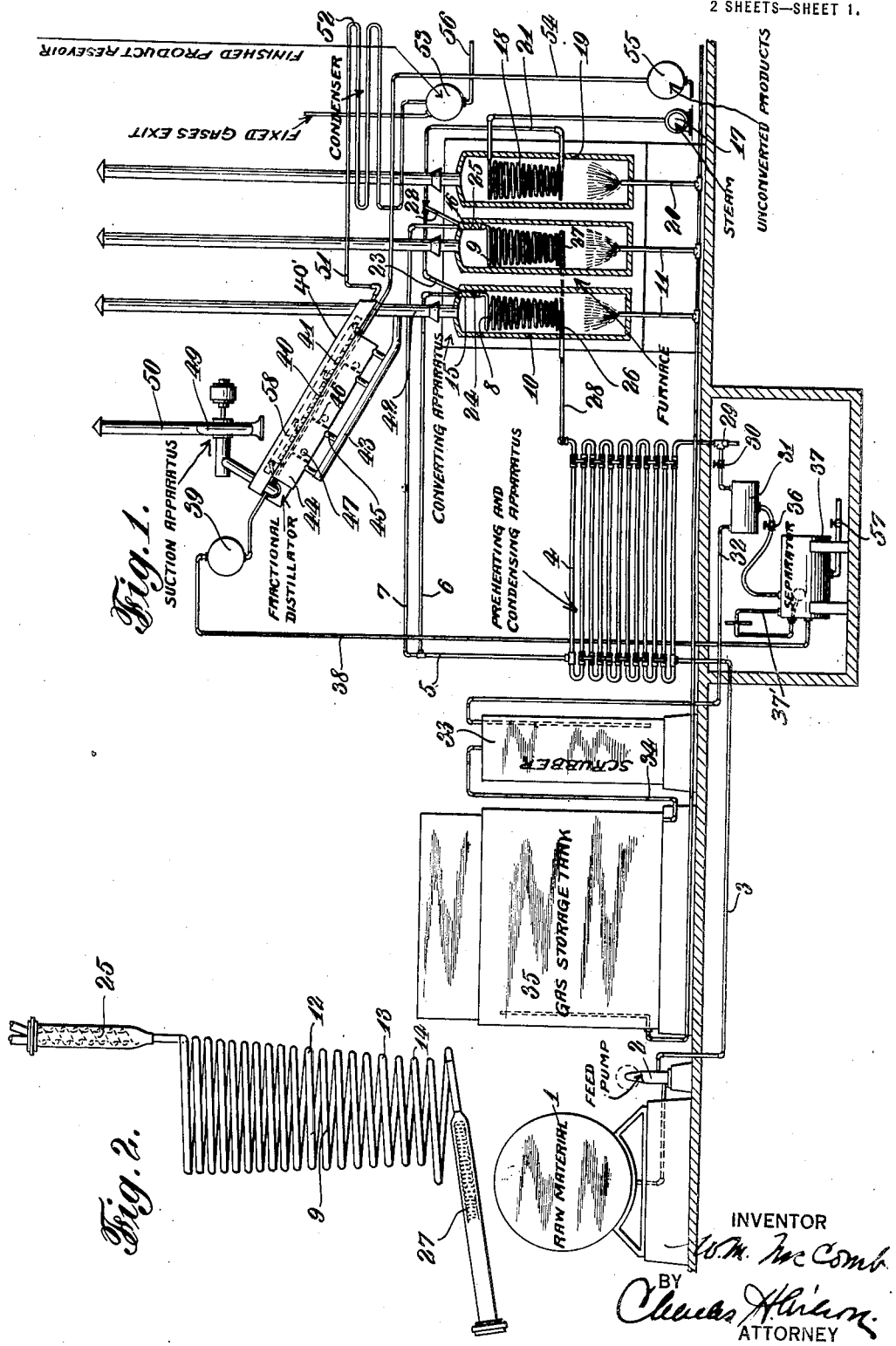

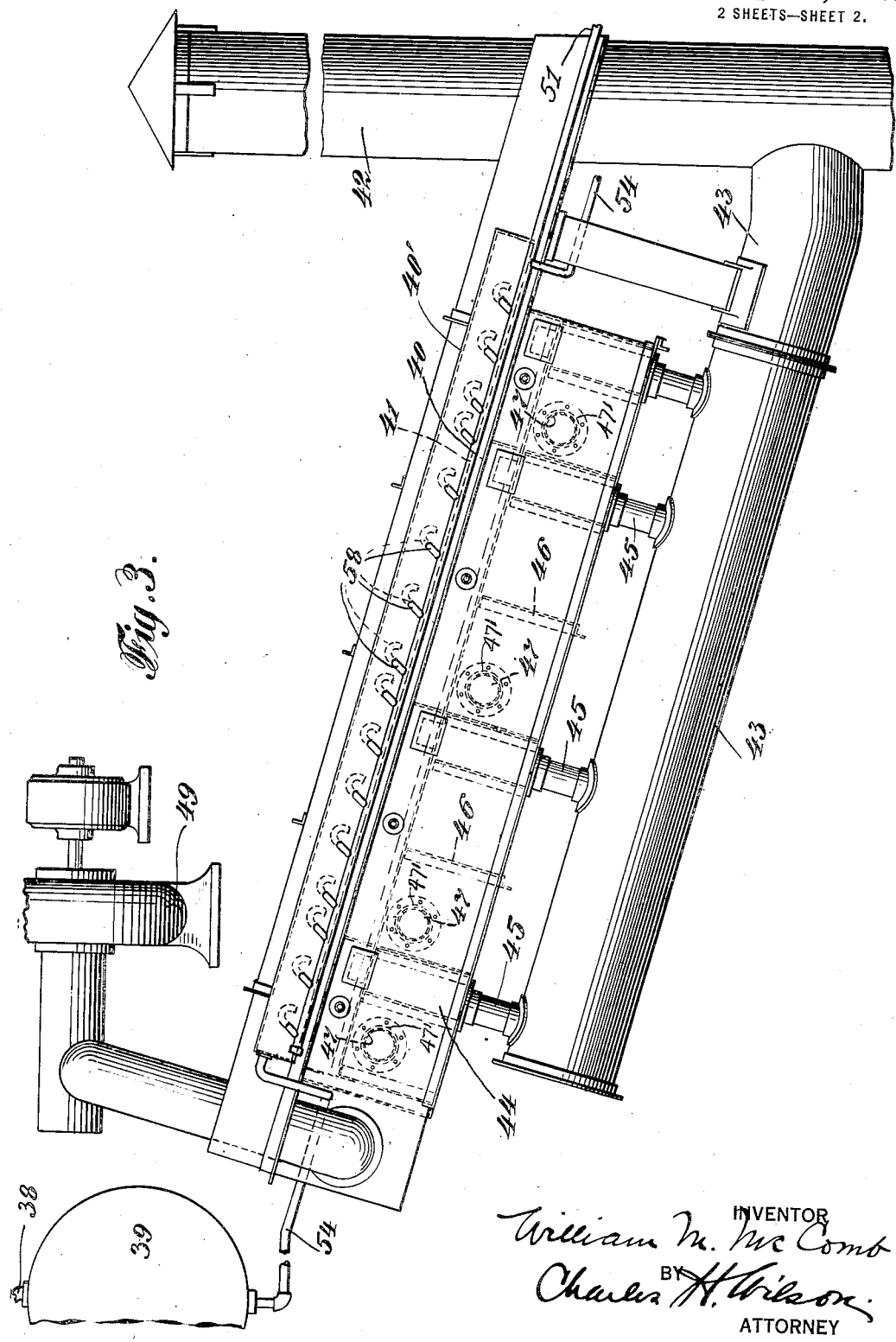

UNITED STATES PATENT OFFICE.

WILLIAM M. McCOMB, OF NEW YORK, N. Y., ASSIGNOR TO WILLIAM J. PATTERSON, TRUSTEE, OF NEW YORK, N. Y.

PROCESS OF CONVERTING LIQUID HYDROCARBONS.

1,337,144.  Specification of Letters Patent.  Patented Apr. 13, 1920.

Application filed October 15, 1918. Serial No. 258,189.

*To all whom it may concern:*

Be it known that I, WILLIAM MONEY-PENNY McCOMB, residing at New York, in the county and State of New York, have invented certain new and useful Improvements in Processes of Converting Liquid Hydrocarbons, of which the following is a specification.

This invention relates to a new and improved process of dissociating higher boiling point hydrocarbons and water into other forms and their constituent elements and resociating the same into lower boiling point hydrocarbon compounds, wherein the various hydrocarbon compounds are first progressively vaporized and immediately upon vaporization intimately associated and co-mingled with the aqueous vapors arising from the water and are afterward dissociated and resociated in a manner substantially as hereinafter described.

Other objects and aims of the invention more or less specific than those referred to above, will be in part obvious and in part pointed out in the course of the following description of the steps and the relation of each step to one or more of the others thereof employed in carrying out my process, and the scope of protection contemplated will be indicated in the appended claims.

In the accompanying drawing where I have shown schematically a preferred embodiment of apparatus suitably adapted to carry out my process:

Figure 1 is a diagrammatic view of the entire apparatus; and

Fig. 2 is an elevational view on an enlarged scale of one part of said apparatus.

Fig. 3 is an elevational view of a fractional distillator which is employed in carrying out certain steps of my improved process.

To bring about the particular physical relation between the several molecules of varying weight and properties composing the several compounds involved, presently to be described, I first pre-heat a hydrocarbon oil to about the point of vaporization of the lowest boiling point constituent, and I vaporize water and the steam or vapors therefrom heated above the point of saturated steam, and to approximately the temperature of the pre-heated oil, and I thereupon immediately introduce one to the other and the resultant mass I then introduce into a suitable tubular vessel after having given a whirling or gyratory motion to the resultant mass. The tubular vessel is so constructed as to accentuate the aforesaid rotary or gyratory motion, first of the liquid and vapor, and ultimately of the vapor body, after all of the hydrocarbons shall have been vaporized progressively. In other words, I progressively heat a gyrating or rotating mass composed of hydrocarbons and aqueous vapors and water until the entire mass has been converted into a mass of intimately mixed hydrocarbons and aqueous vapors.

I preferably employ a tubular vessel of uniform diameter throughout its length, except at its intake and at its outlet orifices, said vessel being bent or turned on such a radius as will most conveniently and completely, and continuously produce and maintain such a revolving or gyratory motion of the liquids and vapor body contained, at the same time having such pitch or decline from the intake to the outlet as to afford an easy progress of the liquids in a downward course toward a source of heat, and so bent or turned that first the liquids and later the vapors in their journey from the intake or entrance of the tubular vessel to their exit therefrom shall progressively approach the source of heat employed in this step of the process, whereby the passage of the heat upward from its source of supply shall be in contrary direction to the progressively heating and gyratory flow of, first the liquids and later the resultant vapor mixture from such liquids in their downward course. Accordingly, the tubular vessel is arranged and constructed so as not only to lend itself to the initiation and at the same time to accentuate the gyratory motion, but lends itself as well to the progressive vaporization of the liquids in their passage through such vessel.

The essential features of the improved process are: First, to give such a gyratory motion to the intermingled aqueous vapors and pre-heated hydrocarbon compounds as will establish a common vapor tension, pressure, and density to the resultant vapors from the progressive vaporization of the hydrocarbons in the presence of the aqueous vapor.

Second, to give such a gyratory motion to the mass as will bring such revolutions of the flowing stream of first, liquids and second their resultant vapors, that substantially every part of the moving mass will be introduced to each of the several progressively increasing temperatures encountered in the journey of the material from the entrance to the exit of the tubular vessel.

Third, to provide such bending or turning of the tubular vessel with such relation thereto of the source of heat as will afford a continuous suitably proportioned heating surface and will insure a direct progression of the mass whereby there is secured first, the volatization of the hydrocarbons, and second, the subsequent progressive heating of the resultant hydrocarbon vapors to a temperature sufficiently high in conjunction with other physical conditions to result in the breaking down of the higher boiling point molecules.

Referring now to the drawings wherein I have illustrated more or less diagrammatically one form of apparatus I have successfully employed to carry out the process, the reference numeral 1 denotes a container or reservoir from which the raw material is supplied. In the present instance I shall describe my process in connection with the treatment of high boiling point hydrocarbon oil ranging in specific gravity from .795 to .9. This oil is drawn from the reservoir 1 as by means of the feed pump 2 and conducted by means of the conduit 3 to a pre-heating apparatus, denoted generally by the reference numeral 4.

The pre-heating apparatus 4, which also operates as a condenser for the material produced in one stage of production thereof, consists of a series of concentric pipes preferably disposed in their relation shown. Each length of pipe is composed of an inner and outer conduit concentrically arranged and spaced apart so that two continuous conduits are provided from one end to the other of the pre-heater or condenser. The raw material is forced through the outer conduit and is heated by the condensing partly finished material, as will hereinafter be described. For the purpose of the present description it will suffice to state that the raw material is heated in this pre-heating device to a point slightly above its initial boiling point.

The pre-heated raw material is then conducted as by means of the conduit 5 and the conduits 6 and 7 to the part of the apparatus where it is next to be treated.

This part of the apparatus consists of at least two vertically disposed tubular vessels 8 and 9 respectively, each of which is located in a retort or furnace 10, and underneath each of said tubular vessels is provided a source of heat 11. Each tubular vessel 8 and 9 is formed by a tube of common diameter bent or turned in such a way that a hollow column is formed whereby there is provided a downwardly pitched avenue of flow from the top to the bottom of each.

It will be noted that the pitch of the tubular structure is also varied, the same being increased in a downward direction, as for instance at the points 12, 13 and 14, the purpose of which will be hereinafter described. Conduit 6 leads to a fitting 15 and the conduit 7 to a similar fitting 16.

17 denotes a water feed pump which is adapted to pump water from any suitable source of supply into a tubular vessel 18, preferably composed of a continuous curved tube disposed in a furnace 19, above a suitable source of heat 20, and leading therefrom is a conduit 21 branching into the conduits 22 and 23, respectively, and the fittings 15 and 16. The water is fed into the tubular vessel 18 at such rate that steam will be delivered by the conduit 21 into the fittings 15 and 16 with a pressure substantially equal to that of the pre-heated raw material that is being fed thereinto at practically the same or slightly higher temperature.

Thus it will be seen that the pre-heated raw material and the steam are simultaneously fed into the fittings 15 and 16.

Located in each of the fittings 15 and 16 is a device, indicated at 24 in the fitting 15 and at 25 in the fitting 16, which is designed to assist the mixing of steam and pre-heated hydrocarbon, to give the latter yet largely in the liquid form a thorough commingling, and to impart to the co-mingled mass a gyratory or whirling motion immediately before they are delivered into their respective tubular vessels. In the present instance this end is accomplished by the provision of a spirally arranged baffle or blade extending longitudinally of each of the fittings 15 and 16, which when the commingling liquids and gases are passing therethrough imparts to the mass the aforesaid gyratory motion, so that when the said mass is delivered into the upper ends of the tubular vessels 8 and 9, the same is in a gyrating or whirling condition. The commingling gyrating masses of the material pass downwardly through the tubular vessels 8 and 9 and are treated in a manner described elsewhere in this specification. It may be repeated, however, that the shape of the tubular vessels 8 and 9 is designed to continue and accentuate the gyratory motion of the mass of material passing therethrough.

At the lower end of each of the tubular vessels 8 and 9 nearest to the source of heat, and in the avenue of flow of the materials therein is provided a body having high specific heat absorbing qualities, or high specific heat, and the gyratory mass of hydrocarbons and aqueous vapors are passed therethrough, under or over the same just prior to their exits from their respective vessels. These bodies are denoted at 26 and 27 respectively. The character of the material of the body which I have referred to as a "body of high specific heat" varies with the re-action to be undertaken. Preferably for reducing a high candle power material of large unsaturated content or a very low initial boiling point naphtha I use nickel in highly attenuated form so spaced in the apparatus at the point of highest temperature as to present the largest possible surface contact with the passing vapors at their nascent moment. For products with lower unsaturated content I preferably employ molybdenum or certain of its alloys, having the same attenuated form and similarly placed within the apparatus. The mass which has passed through the tubular vessels 8 and 9 is then discharged into a single conduit 28, which has preferably a diameter equal to that of the tube forming the tubular vessel, whereby the mass, which formerly occupied the two passages will be constricted and accelerated or compressed so as to occupy or pass through a single conduit of common diameter.

The conduit 28 is connected with one end of the pre-heater condenser 4 and passes through the interior concentrically arranged pipe thereof surrounded by the ingoing raw material which is being pre-heated. The condensation therefore occurs in the mass by the indirect contact with the raw material which it pre-heats and upon leaving the condenser is discharged by means of the conduit 29, valved as at 30, into the container 31. The gases that have not been condensed, after their discharge into the container 31, pass through the conduit 32, into the washer or scrubber 33, whence they are delivered by the conduit 34 into the storage tank 35. Of course, any suitable means may be employed for scrubbing or washing the gas or freeing it from any adherent liquid particles which may be carried over.

The liquids in the container 31 next pass through the conduit 36, into the reservoir 37, at which point the condensed liquids and the part of the water not dissociated are allowed to separate, so that the water may be drawn off, as by means of the valved conduit 57. A pressure from time to time is applied upon the top of the volume of liquid in the reservoir 37 by a force pump (not shown) or by any other suitable means acting through the pipe 37', and the liquid hydrocarbons are forced upwardly through the conduit 38 into a tank 39, whence they are allowed to flow through the fractional distillator, the construction of which will now be described.

This device comprises an inclined platform 40 down which the condensed liquid is permitted to flow in a thin layer over a plurality of ripples 41 which extend transversely of the inclined platform 40. The platform 40 is heated by the waste heat from either or all of the furnaces 10 which surround the tubular vessels 8 and 9, such products passing upwardly from a stack 42, whence they pass into a conduit 43 and are discharged into a box 44 by means of the branch conduits 45. This box is divided into a plurality of compartments by means of partitions indicated at 46, and extending into each of said compartments is a passageway 47, through which a regulated flow of cool air may be admitted to any or all of said compartments, whereby the temperature thereof may be kept at predetermined points. The valves which control the passage of the cool air through the conduits may be of conventional construction. For instance the outer ring or tube indicated by the dotted line 47' may have a lateral aperture which when in registry with an aperture in the conduit 47 will permit air to enter the conduit, the outer tube being rotated so that the position of the apertures may be varied to regulate or entirely shut off the air supply.

A stack 50 is in communication with the box 44 and leads the heated products of combustion through said box from the furnace 10 and discharges them into the atmosphere, and such operation may be facilitated by the use of a suction fan 49 connected with said stack.

It is designed to regulate the heat to the box through a manipulation of valves controlling the branch conduit 45, in such a manner that each compartment of the said box 44 shall be maintained at a predetermined heat whereby the inclined platform located directly above will be maintained at a desired predetermined temperature. In other words, the platform 40 will consist of a plurality of heated surface zones, the uppermost zone being substantially that of the lowest boiling point hydrocarbon constituent which is being passed over the aforesaid platform. The zones as they approach the lower end of the inclined platform 40 are of a higher temperature, in the present instance the temperature being preferably graded as follows: The upper zone is heated to a temperature of approximately 90° centigrade, the next zone to a temperature of approximately 120° centigrade, and the third zone to a temperature of approximately 140° centigrade, and the fourth zone to a temperature approximately 160° centigrade. The number of zones, as well as temperatures thereof, will of course, be varied in accordance with the portion it is desired to separate from the liquid hydrocarbon being treated. The inclined platform 40 is of course entirely inclosed in a boxing 40', the latter having the top, side and end walls.

Located directly above the rippled inclined platform 40 are a plurality of conduits 58, the mouths of which are open and disposed adjacent the flowing hydrocarbon which is being volatilized through its passage over the aforesaid heated platform, and these open mouthed conduits collect the volatilized constituents of the liquid hydrocarbons whereupon such volatilized constituents pass through the conduit 51 into the condenser 52, whereupon after condensation the finished product is discharged into the reservoir 53. The non-volatilized constituents passing through the fractional distillator are discharged into a conduit 54 leading to the tank 55, from which they may be pumped by any suitable means back into the storage tank 1, thereafter to be retreated.

A vacuum pump connected with the reservoir 53 through the conduit 56 may if desired be employed for the purpose of compelling accelerating the flow of the distilled hydrocarbons through the conduits 56.

Referring now to the manner of carrying out my process, it may be stated that the gyrating mass of progressively heating hydrocarbon and aqueous vapors in the tubular vessel after their complete vaporization are in their progressive course downward toward the source of heat continually accumulating heat from the progressively increasing temperature zones encountered in their journey. Not only in the beginning do they receive the necessary latent heat and vaporization heat, but subsequently, they receive the latent heat of the vapors in proportion to their several specific heats during the period of contact and the intensity of the temperature so encountered until they reach the point of highest temperature within said tubular vessel, or that point nearest to the source of heat when they are brought in contact with the body of high specific heat, hereinbefore referred to.

In my said invention herein described, wherein the gyrating or rotating mass of aqueous and hydrocarbon vapors are progressively volatilized and heated in their journey from ingress to egress of the converting tubular vessel, the proportionating of time or the proportionating of area of contact with the radiant surface of the vessel is attained by varying the pitch or incline, as indicated, at the various temperatures in said downward course which the gyrating and progressively heating mass of heterogeneous material is journeying. The above referred to proportionating of heating time or surface is accomplished by varying the pitch or incline as indicated in Fig. 2 of the particular part of the tubular vessel to obtain the particular time necessary to convey by radiation from the radiant inter-surface of said tubular vessel a quantity of heat proportioned to the quantity of the intimately commingled mass of aqueous and hydrocarbon aqueous matter.

The purposes served by the presence of the aqueous vapor in the tubular vessel with the hydrocarbons during the course of their progressive vaporization according to their boiling point temperatures and their subsequent introduction, commingled with the aqueous vapors, to a temperature sufficiently high to bring about degradation of the molecular forms and the dissociation into constituent elements or molecules of less weight and of the same or different proportions of the constituent elements are:

(1) By reason of the higher specific heat of the aqueous vapors than the average specific heat of the vapors from the lowest boiling hydrocarbon compounds in mechanical association and intimately commingled with the aqueous vapors, a larger proportion of the radiant heat entering the tubular vessel is absorbed by the aqueous vapors thus tending to retard the accumulation of heat within such lower boiling point hydrocarbon molecules, and in this way preventing premature degradation of such molecules, or their breaking down into hydrogen and carboniferous matter with the resultant deposit of carbon in the tubular vessel through cooling before the higher boiling hydrocarbons have acquired sufficient heat saturation to prepare them for their breaking down into simpler forms.

(2) Water or aqueous vapor through its heat absorbing capacity, as distinguished from the same quality in hydrocarbon molecules, retards the breaking up or the overturning of thermal equilibrium within the molecule and resultant degradation by the accumulation of latent heat.

(3) In this my process for the conversion of higher boiling point and heavier hydrocarbon compounds of both the saturated and unsaturated series into lower boiling point and lighter hydrocarbon compounds of both saturated and unsaturated series an important step is that in relation to the preheating of the hydrocarbon materials to a point slightly under the boiling or vaporization point of the lowest boiling or vaporizing content before the introduction to them of the saturated steam above referred to.

The principal purposes served by this pre-heating is first, to decrease the apparent viscosity of the oil in order that it will flow more freely through the tubular vessel. The second is that the major portion of the water introduced as steam to the hydrocarbon material simultaneously with its introduction into the vessel will remain in the shape of aqueous vapor and not condense back to water, as it would if the hydrocarbons were introduced in a cold condition. The heat balance based on the specific heat of the substances will be longest maintained, which principle heretofore referred to, is pertinent to the successful carrying out of the process; and third, that the period may be shortened in which the chemically heterogeneous mass of material is subject to the progressively increasing action of the heat and physical movement for the purpose of intimately commingling the materials to the end that physical homogeneity may be attained.

In the practical application of these principles in the herein described process having for its purpose the change of higher boiling point hydrocarbons to those of lower boiling points, this pre-heating is accomplished in the work of condensing the products after their conversion in the process to the end that an economy of operation is attained in that the heat contained in the vapors from the converting vessel which would otherwise be absorbed by water in an ordinary condenser is given up to the hydrocarbon material being fed into the converting vessel prior to the introduction of the saturated steam, substantially as herein described.

In my invention herein described an essential feature of the process is that there be no expansion of the vapors at any point in the process after their admission as pre-heated hydrocarbon oil and aqueous vapor through the tubular vessel until they are condensed and pass into the receiving tank. For that reason the enlarged section at the point of egress through the tubular vessel and immediately before entering the condenser contains the body of material having a high specific heat herein referred to, and I introduce sufficient volume of this body to fill the excess space in said enlarged lower end of the before mentioned tubular vessel.

Not only is it desirable to avoid any material expansion by the vapors until after condensing, but it is also desirable to increase the pressure of the vapors during condensation to avoid a siphoning action produced by the condensation of portions of the converted mass. This is accomplished by leading the material in vapor form from two tubular vessels into one condenser, the cross-sectional area of the latter being smaller than the corresponding area of the before mentioned tubular vessels.

I have found that in the operation of my process and in the utilization of the physical and chemical principles involved therein, the proportionately largest amount of conversion of the best quality is obtained when the entire operation, including the pre-heating above referred to; the progressive vaporization in the tubular vessel herein described; and the condensation of the vapors after conversion, occurs under a pressure varying according to the physical constants of the hydrocarbon material being treated. as for example:

65 pounds pressure per square inch with hydrocarbon oil of 0.795 gravity and increasing gradually to 90 pounds with oil of 0.88 gravity.

I have also found in the application of the physical and chemical principles utilized in my said invention, that in order to efficiently maintain and carry out most completely the progressive heating herein referred to, this result is best obtained by drawing the heated products of combustion from the source of heat in contrary direction to the flowing material being converted within the tubular vessel herein referred to, and not relying wholly on natural draft or simply the force of the blower burner. This is accomplished by a suction blower of a suitable type located at a convenient point in the apparatus as hereinbefore described.

I have also found in the application of the physical and chemical principles utilized in my said invention, and herein described, that in converting hydrocarbon oils ranging in density from for instance 0.795 to 0.88, being those generally commercially practical to obtain in sufficient quantities to warrant the operation on a commercial scale, the temperature for conversion should range from approximately 260° centigrade at the top of the converting furnace where the mixture of pre-heated oil and aqueous vapor are introduced to the converting tubular vessel up to approximately 760° centigrade at the bottom of the furnace or the point where the tubular vessel leaves said furnace. The temperature at the lower part of the tubular vessel on the inside should range from 350° centigrade to 400° centigrade, in accordance with the gravity of the hydrocarbon oil being converted, the heavier the oil the higher the temperature, and conversely.

The temperatures and pressures herein given apply to the production by conversion of petroleum distillates of 28 to 38 gravity into the minimum of unsaturated products, and the maximum of saturated products.

The detailed description of operation herein given applies particularly to the first or initial conversion of the material. But in the operation of my process as herein described, it is not possible to completely convert all of the material in the primary conversion, or the first time the material passes through the converting tubular vessels.

It will be understood that after the first conversion the unconverted material may be again treated in the manner already described and further hydrocarbon constituents removed therefrom.

I realize that many changes could be made in this construction without departing from the essence of my invention, but it is to be understood that the matter contained in the above description and shown in the accompanying drawing shall be interpreted as illustrative only and not in a limiting sense.

Having thus described my invention, and in what manner the same may be performed, what I claim as new and desire to secure by Letters Patent is:

1. The herein described process of reducing higher boiling point hydrocarbons into lower boiling point hydrocarbons, which consists in heating said higher boiling point hydrocarbons to a predetermined temperature, mixing the same with aqueous vapor, and projecting said mass into a sinuous, closed passageway, of gradually increasing downward pitch toward a source of heat.

2. The herein described process of reducing higher boiling point hydrocarbons into lower boiling point hydrocarbons, which consists in preheating said higher boiling point hydrocarbons to a temperature approximating the boiling point of their lowest boiling point constituent, mixing said heated hydrocarbons with aqueous vapor at substantially the same temperature and pressure, and projecting said mass through a sinuously formed container having a downward pitch which gradually increases as it approaches a source of heat.

3. The herein described process of reducing higher boiling point hydrocarbons into lower boiling point hydrocarbons, which consists in heating said higher boiling point hydrocarbons to a predetermined temperature, mixing therewith aqueous vapor, at substantially equal pressure and temperature, projecting the same through a sinuously formed container, having a gradually increasing downward pitch as it approaches a source of heat, passing the resultant mass through a condenser, and then fractionally distilling said mass.

4. The herein described process of reducing higher boiling point hydrocarbons into lower boiling point hydrocarbons, which consists in preheating such higher boiling point hydrocarbons, mixing the same with aqueous vapor in a closed vertically disposed sinuously formed container, having a gradually increasing pitch near its lower end as it approaches a source of heat, condensing the converted mass and then fractionally distilling the same.

5. The herein described process of reducing higher boiling point hydrocarbons into lower boiling point hydrocarbons, which consists in preheating such higher boiling point hydrocarbons to a predetermined temperature, mixing the same with aqueous vapor in a plurality of vertically disposed sinuously formed closed containers, having increased pitches as they approach their lower ends, toward a source of heat, conducting said commingled masses through a single conduit in contact with a body of high specific heat, and then condensing and fractionally distilling said converted mass.

6. The herein described process of reducing higher boiling point hydrocarbons into lower boiling point hydrocarbons, which consists in first preheating said higher boiling point hydrocarbons, mixing the same with aqueous vapor, projecting said mixture into a vertically disposed sinuously formed container, having a gradually increasing pitch near its lower end, applying heat to the lower end of said container, so that the mass moving therethrough will be progressively heated, causing said mass to come in contact with a body of high specific heat located at the point of highest temperature within said container, condensing said mass, removing moisture and the fixed gases therefrom, and then distilling off such portions of the condensed volatile materials whose boiling points lie within a predetermined range.

7. The herein described process of reducing higher boiling point hydrocarbons into lower boiling point hydrocarbons, which consists in first preheating said higher boiling point hydrocarbons, mixing the same with aqueous vapor, and projecting said mixture into a vertically disposed sinuously formed container, having an increasing pitch approaching its lower end, applying heat to the lower end of said container, so that the mass moving therethrough will be progressively heated, causing said mass to come in contact with a body of high specific heat located at the point of highest temperature within said container, separating the moisture and fixed gases from said condensed mass, and then fractionally distilling the same by passing it in a thin film over an inclined surface provided with a plurality of differently heated zones, and finally collecting and condensing the volatile constituents produced by such volatile distillation.

8. The herein described process of reducing higher boiling point hydrocarbons into lower boiling point hydrocarbons, which consists in first heating said higher boiling point hydrocarbons to a predetermined temperature, commingling therewith the aqueous vapor at substantially equal temparature and pressure, projecting said commingled mass into a sinuously formed vessel, having a pitch which gradually increases as it moves downwardly toward a source of heat.

9. The herein described process of reducing higher boiling point hydrocarbons into lower boiling point hydrocarbons, which consists in first heating said higher boiling point hydrocarbons to a predetermined temperature, commingling therewith the aqueous vapor at substantially equal temperature and pressure, projecting said commingled mass into a sinuously formed vessel, having a pitch which gradually increases as it moves downwardly toward a source of heat, and then passing said mass with an accelerated velocity through a conduit in contact with a body of high specific heat.

In testimony whereof I affix my signature in the presence of two witnesses.

WILLIAM M. McCOMB.

Witnesses:
EMMA WEINBERG,
HELEN A. CAREY.